(12) United States Patent
Heule et al.

(10) Patent No.: US 7,311,480 B2
(45) Date of Patent: Dec. 25, 2007

(54) PLATE-SHAPED CUTTER INSERT FOR DIRECT CLAMPING ATTACHMENT IN A BASE BODY

(75) Inventors: Heinrich Heule, Au (CH); Harry Studer, Balgach (CH)

(73) Assignee: Ulf Heule, Balgach (CH)

( * ) Notice: Subject to any disclaimer, the term of this patent is extended or adjusted under 35 U.S.C. 154(b) by 0 days.

(21) Appl. No.: 10/985,328

(22) Filed: Nov. 10, 2004

(65) Prior Publication Data

US 2005/0129473 A1 Jun. 16, 2005

(30) Foreign Application Priority Data

Nov. 14, 2003 (DE) .................. 103 53 514

(51) Int. Cl.
*B23B 51/02* (2006.01)
(52) U.S. Cl. ............... 408/233; 408/227; 408/713
(58) Field of Classification Search ......... 408/223, 408/227, 230, 231, 233, 713; 407/113–117
See application file for complete search history.

(56) References Cited

U.S. PATENT DOCUMENTS

| 262,588 | A | * | 8/1882 | Hartshorn | 408/230 |
|---|---|---|---|---|---|
| 2,328,629 | A | * | 9/1943 | Eich et al. | 408/230 |
| 3,443,459 | A | * | 5/1969 | Bruce, Jr. et al. | 408/230 |
| 4,065,224 | A | * | 12/1977 | Siddall | 408/230 |
| 4,116,580 | A | * | 9/1978 | Hall et al. | 408/230 |
| 4,222,690 | A | * | 9/1980 | Hosoi | 408/230 |
| 4,337,677 | A | | 7/1982 | Rauckhorst et al. | |
| 4,565,473 | A | | 1/1986 | Hosoi | |
| 4,566,828 | A | * | 1/1986 | Reinauer | 407/48 |
| 4,687,387 | A | * | 8/1987 | Roos | 408/144 |
| 4,744,704 | A | * | 5/1988 | Galvefors | 408/144 |
| 4,744,705 | A | * | 5/1988 | Imanaga | 408/230 |
| 4,802,799 | A | * | 2/1989 | Rachev | 408/144 |
| 4,854,789 | A | | 8/1989 | Evasanko, Jr. | |
| 4,950,108 | A | * | 8/1990 | Roos | 408/59 |
| 5,782,589 | A | * | 7/1998 | Cole | 408/233 |

(Continued)

FOREIGN PATENT DOCUMENTS

DE 36 28 262 C2 1/1988

(Continued)

*Primary Examiner*—Monica Carter
*Assistant Examiner*—Michael W. Talbot
(74) *Attorney, Agent, or Firm*—Wood, Herron & Evans LLP

(57) ABSTRACT

The invention describes a drill plate with a clamping attachment in a rotatably driven base body, which on one of its end faces forms a centering groove that is open towards the top. A clamping slot extending into the material of the base body is arranged at the bottom of the centering groove. The centering groove is bounded by at least two opposing mounting jaws, with at least two diametrically opposing stop faces arranged in the region of the clamping jaws for providing centering contact with the drill plate. The clamping attachment is formed by a mounting screw which clamps the drill plate in the centering groove. To improve transfer of the operating torque from the drill plate to the base body and to facilitate handling, at least two centering fins that are diametrically opposed with respect to the transverse center axis are arranged on the drill plate. The centering fins contact corresponding stop faces disposed on the corresponding clamping jaws of the base body.

34 Claims, 4 Drawing Sheets

U.S. PATENT DOCUMENTS

| | | | |
|---|---|---|---|
| 5,904,455 A * | 5/1999 | Krenzer et al. | 408/144 |
| 6,012,881 A * | 1/2000 | Scheer | 408/227 |
| 6,132,149 A * | 10/2000 | Howarth et al. | 408/230 |
| 6,158,927 A * | 12/2000 | Cole et al. | 407/48 |
| 6,196,769 B1 * | 3/2001 | Satran et al. | 407/40 |
| 6,514,016 B1 | 2/2003 | Schultz | |
| 6,514,019 B1 * | 2/2003 | Schulz | 408/59 |
| 6,530,728 B2 * | 3/2003 | Eriksson | 408/233 |
| 6,551,036 B2 * | 4/2003 | Heule | 408/227 |
| 6,899,495 B2 * | 5/2005 | Hansson et al. | 408/144 |
| 7,008,150 B2 * | 3/2006 | Krenzer | 408/144 |
| 7,048,480 B2 * | 5/2006 | Borschert et al. | 408/144 |
| 2001/0031182 A1 * | 10/2001 | Widin | 408/230 |
| 2002/0114675 A1 * | 8/2002 | Krenzer | 408/144 |
| 2005/0135888 A1 * | 6/2005 | Stokey et al. | 408/230 |

FOREIGN PATENT DOCUMENTS

| | | | |
|---|---|---|---|
| DE | 4403300 A1 * | 8/1995 | |
| DE | 197 36 598 A1 | 3/1999 | |
| DE | 10307213 A1 * | 9/2004 | |
| DE | 102005012026 A1 * | 9/2006 | |
| GB | 2184046 A * | 6/1987 | |
| JP | 54026591 A * | 2/1979 | |
| JP | 56015907 A * | 2/1981 | |
| JP | 10193334 A * | 7/1998 | |
| JP | 2000084718 A * | 3/2000 | |

* cited by examiner

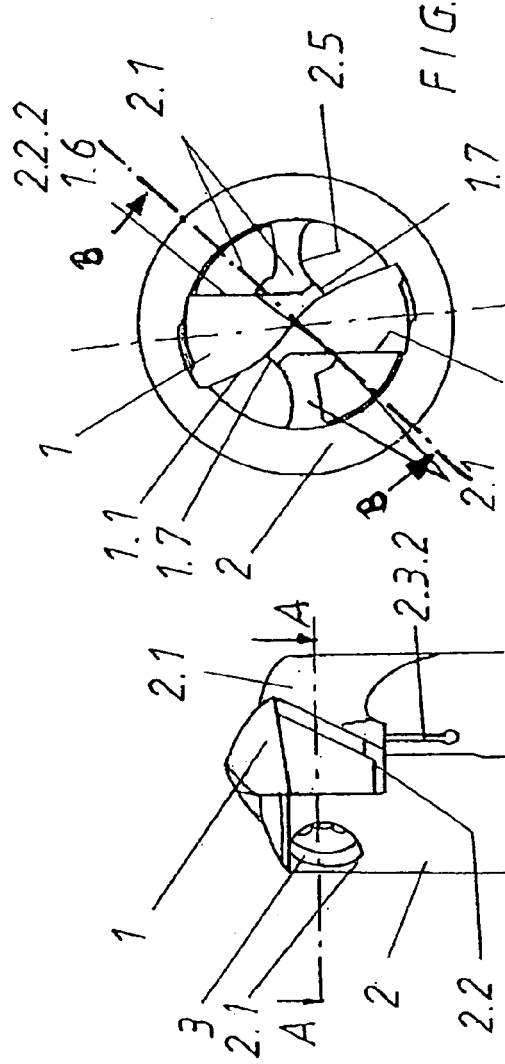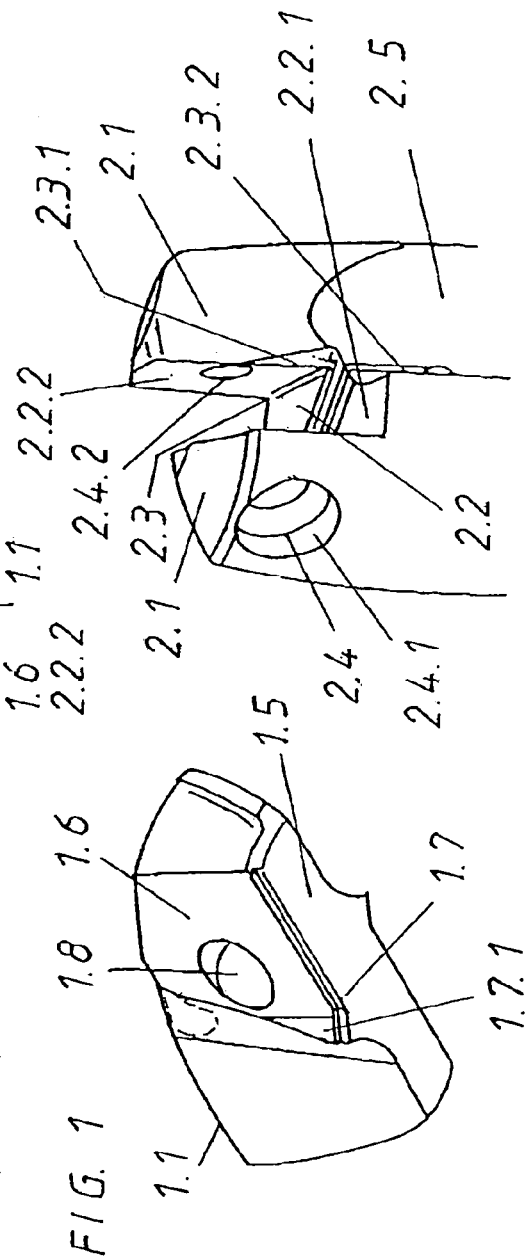

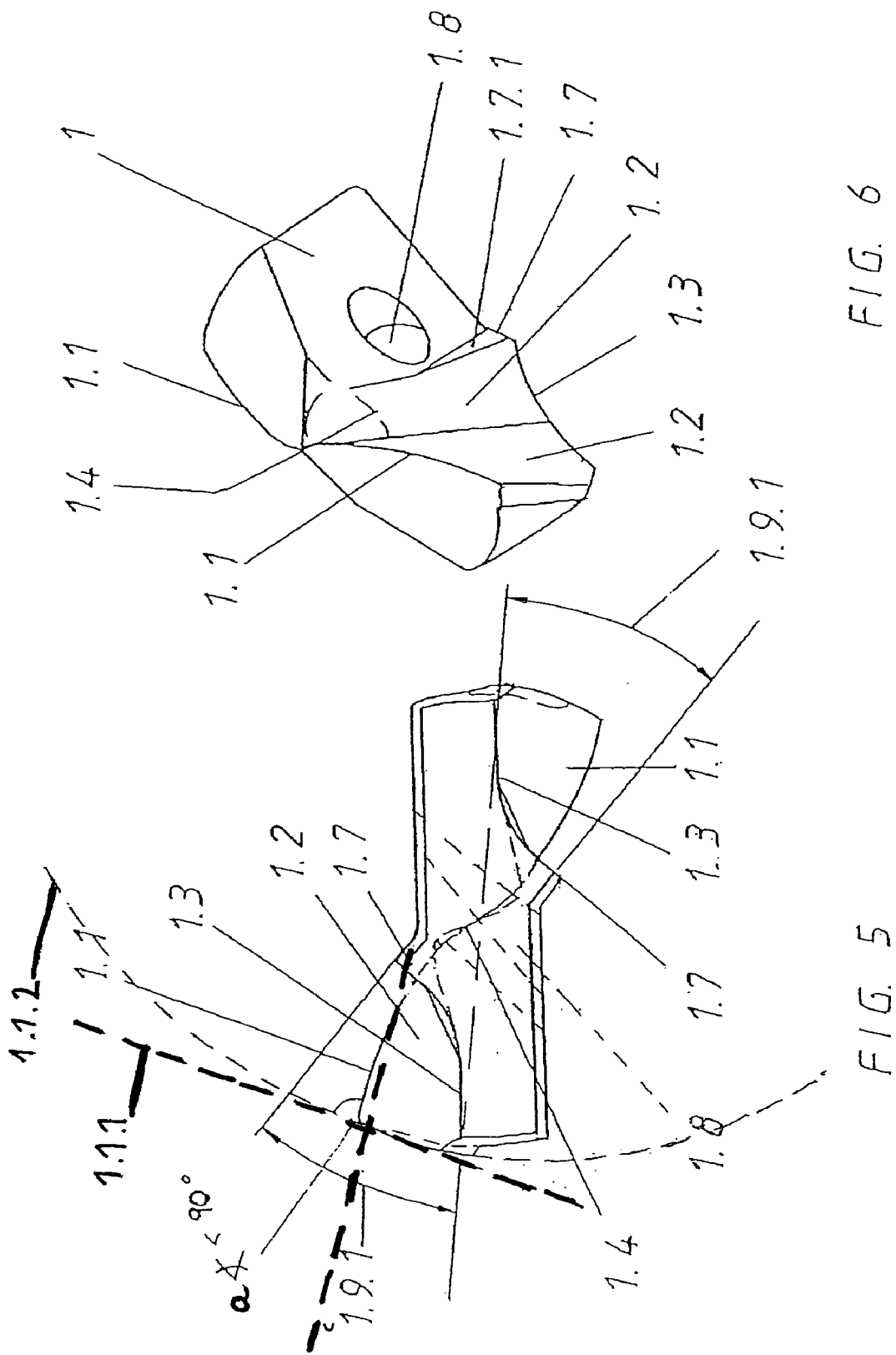

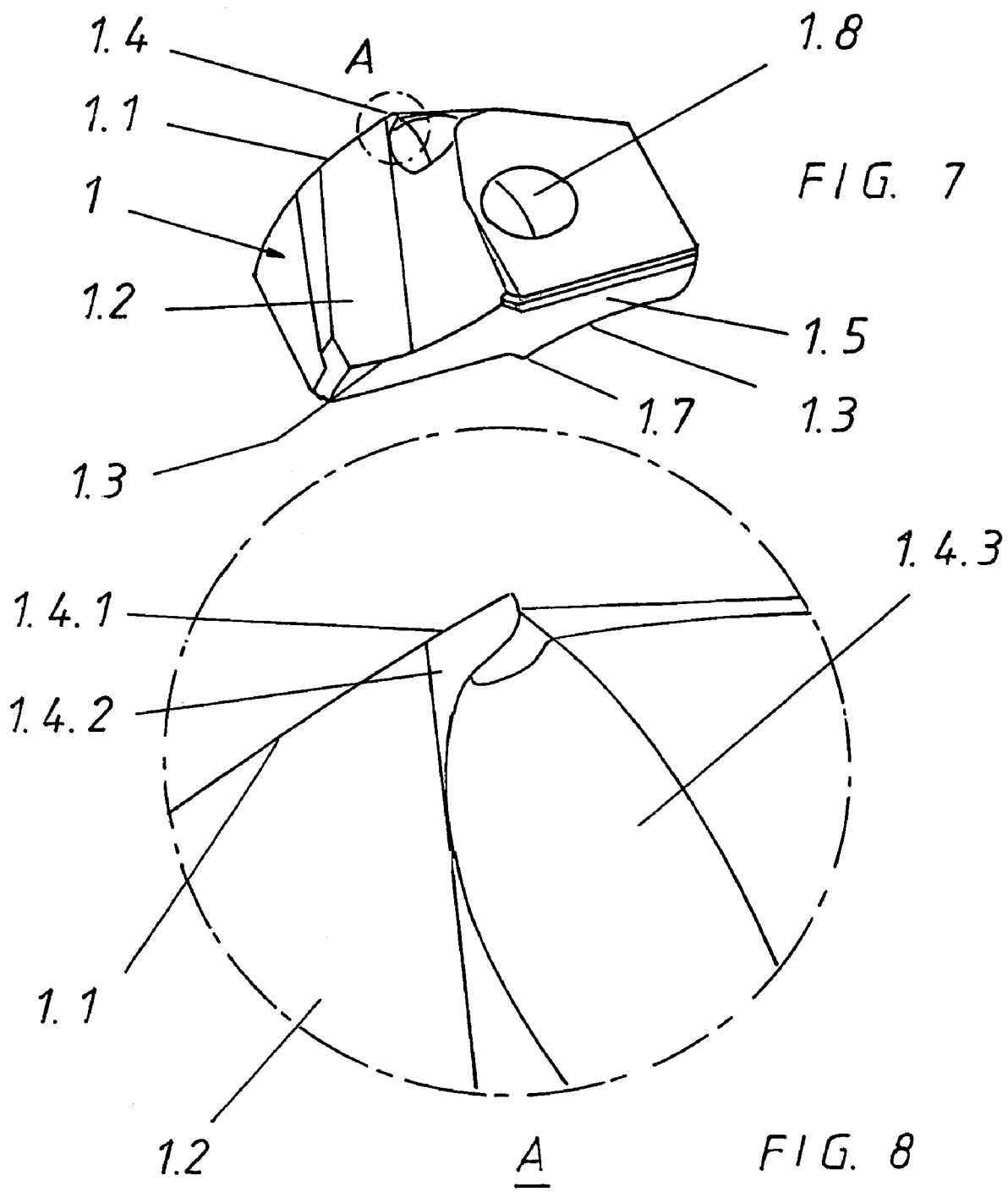

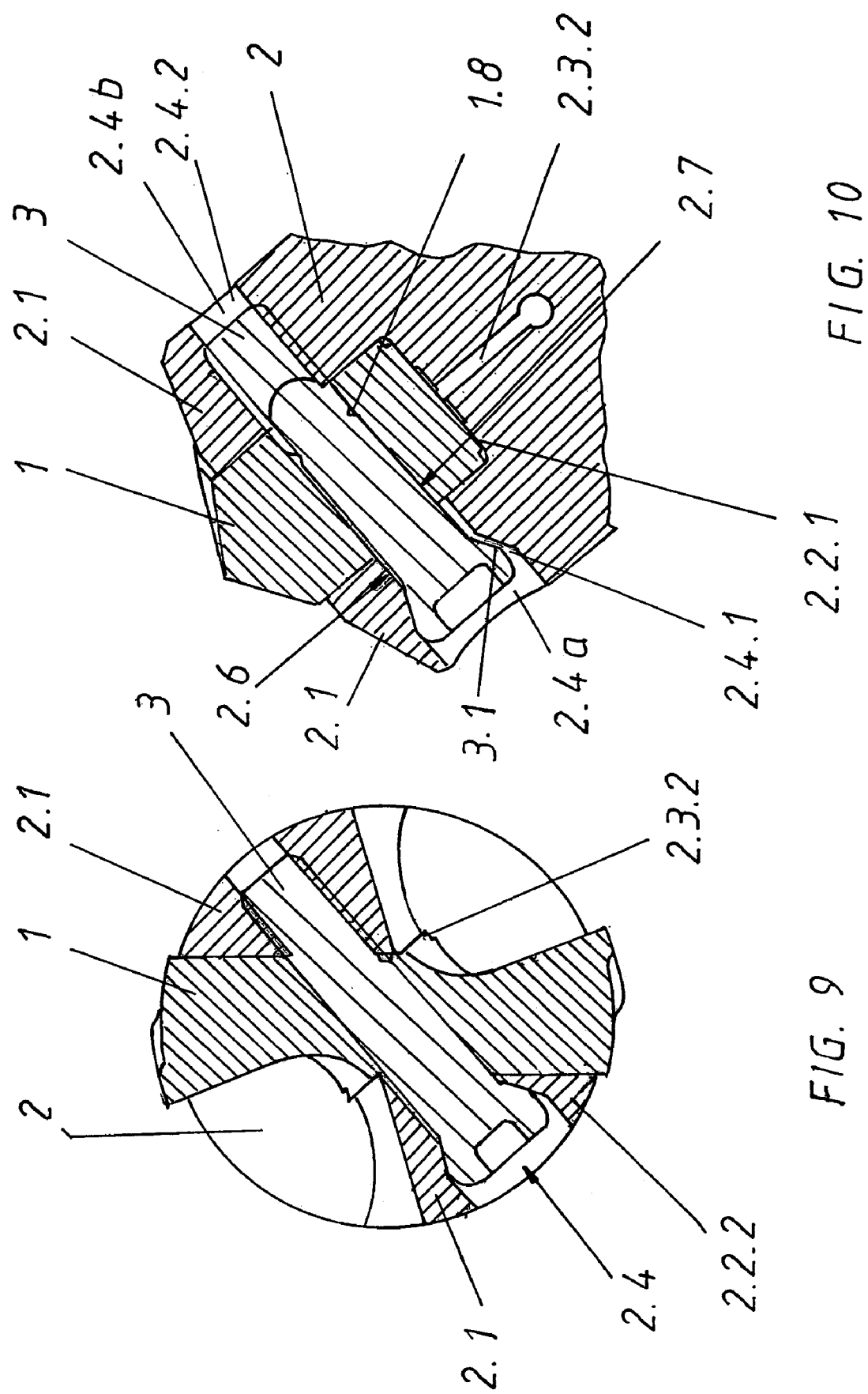

PLATE-SHAPED CUTTER INSERT FOR DIRECT CLAMPING ATTACHMENT IN A BASE BODY

BACKGROUND OF THE INVENTION.

1) Field of the Invention

The invention relates to a plate-shared cutter insert, hereinafter also referred to as drill plate, for direct clamping attachment in a rotary driven base body forming on one of its end faces a centering groove that is open towards the top, wherein the centering groove is bounded by at least two opposing mounting jaws, with at least one centering face which is located in the region of the mounting jaws for providing a centering contact with the drill plate with the clamping attachment provided by a mounting screw which centers the drill plate in the centering groove.

2) Description of the Related Art

The drill plate with a clamping attachment in a base body has been disclosed, for example, in DE 197 36 598 69 C2. The upper end face of the base body hereby forms a groove that is open towards the top and in which the drill plate can be inserted. A clamping slot through which an associated clamping screw extends is arranged in the bottom of the groove.

According to the embodiment disclosed in DE 197 36 598 C2, the drill plate has diametrically opposing adjustable stop faces formed by threaded screws which are located in corresponding clamping jaws in the base body and shaped to be adjustable therein. The bolt side of the screws is supported on diametrically opposing stop faces on the drill plate.

When the drill plate is inserted into the base body, the drill plate is therefore slightly rotated about a rotation angle against the operating direction of the drill, so that the contact faces in the clamping jaws (formed by the bolt-side ends of the adjustment screws) and the associated contact faces in the drill plate contact each other for transmitting the load.

The connection is secured and formfittingly maintained by tightening a clamping screw that extends through the clamping slot.

This known arrangement has the disadvantage that the adjustment step for centering the drill plate in the base body is quite complex due to the diametrically opposing adjustment elements. Each adjustment screw has to be separately adjusted with a corresponding adjustment tool, so that the drill plate can be preliminarily centered in the base body.

Using these adjustment screws is not only complex, but disadvantageously, the clamping screw also has to be manipulated so as to finally secure the drill plate in the base body.

Accordingly, three separate elements have to be adjusted, which makes the adjustment so complex.

Disadvantageously, the adjustment elements formed by the two diametrically opposing adjustment screws are located in a different plane from the clamping screw that extends through the clamping slot.

Transfer of the clamping force to the drill plate is therefore inadequate, because the receiving opening for the drill plate has an approximately trapezoidal cross-section. As a result, due to the trapezoidal shape, the drill plate is only tightened in the upper region of the receiving groove, even if the clamping screw is tightened by applying a large torque.

As another disadvantage, the location of the clamping screw and the location of the clamping slot must be arranged relative far away below the clamping contact (receiving groove) between drill plate and base body, because (in the plane above) the adjustment elements formed as threaded screws have to be arranged.

Since the elements are mounted in separate planes, a relatively large installation space is needed, which degrades the clamping action of the drill plate in the base body.

Adjusting the adjustment elements may also present a problem, because the adjustment elements may be moved unintentionally (or even intentionally), which can misaligned the center position of the drill plate in the base body. A readjustment can then become quite complex.

In addition, this is a statically overdetermined system, because when the adjustment screws are strongly tightened for the preliminary attachment of the drill plate, the associated clamping jaws in the base body are already spread apart and therefore have to be moved towards each other and pressed against each other by tightening the clamping screw.

A transfer of high operating torques to the base body may also have the following disadvantage:

The corresponding clamping forces exerted on the drill plate are transmitted to the clamping jaws in the base body. The clamping jaws are therefore subjected to shear forces.

Because the clamping jaws are weakened by the clamping slot that extends downwardly from the groove bottom, the clamping jaws can inadvertently shear off for higher loads.

Disadvantageously, the trapezoidal centering groove receiving the drill plate is spread apart when high operating torques are transmitted, which causes high stress in the material of the clamping jaws in the base body. In addition, the drill plate is also subjected to shear forces, because it does no longer form fittingly contact the sidewalls of the deformed grooves, which may cause the drill plate to break apart.

It is therefore an object of the invention to modify a drill plate with a base body, so that the drill plate can be centered in the base body without additional adjustable stop elements, and so that greater operating torques can be transmitted to the drill plate without risking damage to the clamping jaws of the base body or to the drill plate.

BRIEF SUMMARY OR THE INVENTION

The object of the invention is solved in that at least two, with respect to the transverse center axis mutually opposing, centering fins are provided on the drill plate which contact associated stop faces located on the associated mounting jaws of the base body.

According to the invention, limit stops formed by threaded screws are thereby eliminated. Fabrication and adjustment of the drill plate are facilitated by arranging fixed centering fins.

According to an advantageous embodiment of the invention, at least one mounting screw that penetrates the two mounting jaws in the base body can extend through the drill plate.

The disclosed technical teaching provides the significant advantage that a bore for receiving a fastening screw is arranged in the drill plate itself. The drill plate is then no longer only indirectly tightened, as is the case in the state-of-the-art. On the other hand, the fastening screw disclosed in the aforedescribed DE 197 36 598 C2 was arranged below and outside the drill plate.

By arranging a fastening screw directly in the drill plate, the drill plate is advantageously pulled downwardly towards the groove bottom when the fastening screw is tightened, where it makes formfitting and force-transmitting contact.

Advantageously, the aforementioned opposing centering fins on the drill plate can be arranged below the bore for the mounting screw on the drill plate.

However, the invention is not limited to this embodiment. Alternatively, the opposing centering fins on the drill plate can be arranged at approximately the same height as the bore for the mounting screw on the drill plate.

It is known to provide a drill plate with a through-bore for a fastening screw in order to secure the drill plate with such fastening screw in the base body. This is disclosed, for example, in DE 198 34 635 A1. However, this arrangement has the disadvantage that the foot of the drill plate has a connector-shaped projection formed as a pin that is form fittingly received and engages in a corresponding recess disposed in the bottom of the base body. Such type of pin can be subjected to large torques and can shear off when greater operating torques are applied.

With the present invention, instead of a pin located at the foot or bottom, diametrically opposed centering fins capable of transferring large torques can be arranged with a relatively large radial separation. This arrangement eliminates a stop (pin) located proximate to the rotation axis for transferring the operating torque, because according to the invention the centering fins are radially spaced apart and therefore better able to transfer a significantly greater operating torque to the base body.

According to a preferred embodiment of the invention, the centering fins are arranged approximately in the region of the bottom end face of the drill plate. However, the invention is not limited to this embodiment. Alternatively, as described above, the centering within can also have a corresponding axial distance from the base-side end face of the drill plate and hence be placed closer to the bore through which the fastening screw extends.

The closer the centering fins are moved upwardly towards the main cutting edges that transmit the torque, the smaller are the torque loads that have to be transmitted to the base body by the material of the drill plate. This significantly increases the service life of the drill plate, because it is no longer subjected to large torques, because the force is directly transmitted from the main cutting edges to the centering fins which have a small axial separation from the cutting edges.

The main force in metal-cutting machining is transmitted via the clamping jaws which form a large-area load-transmitting connection, thereby reducing the risk that the centering groove in the base body that receives the drill plate is inadvertently spread apart in this region.

The main load of the torque transmission is transmitted from the drill plate via short connecting paths to the corresponding clamping jaws in the base body, where it is received and transmitted by large-area stop faces, which are also located diametrically opposed with respect to the transverse center axis.

Advantageously, the position of the centering faces on the drill plate is approximately perpendicular to the axis of the mounting bore. In this way, the centering fins contact the corresponding stop faces in the base body first, before the fastening screw is tightened to achieve a clamping action.

The clamping action is achieved in a conventional manner by providing a clamping slot that extends from the bottom of the groove into the base body.

The clamping slot formed in the base body in the axial direction and oriented parallel to the centering faces causes first the centering faces to close, centering the drill plate, before the drill plate is clamped by the clamping faces. The centering and clamping operation take advantage of the elasticity of the fastening system of the base body.

In the present application, on one hand, the combination between a drill plate and a base body is claimed as an invention, and, on the other hand, also the drill plate alone.

Protection is sought for the drill plate independent of its attachment in a base body, because the drill plate itself includes inventive features.

For solving the object of achieving chip-breaking and centering during the drilling operation by a convex main cutting edge through a peeling cutting motion, it is additionally provided that the chip space is enlarged by a transition to a concave outlet edge.

The main cutting edge of the drill plate has hereby a convex shape and intersects with the tangent of the drill diameter at an angle of <90°, so that the relative cutting motion in the outer half of the diameter range has a "peeling" effect.

Conversely, the outlet edge of the drill plate has a concave shape so as to make the chip space as large as possible.

The chip face transitions continuously from the convex geometry of the main cutting edge into the concave geometry of the outlet edge, which improves chip breaking and optimizes chip removal.

According to the invention, a convex face is formed on the main cutting edge, which improves chip breaking, and a transition into a concave outlet edge, which improves chip removal.

According to an advantageous embodiment of the invention regarding the configuration of the drill plate, a special tip is arranged on the front side of the drill plate. These measures reduce the forces and optimize centering, because the resulting chips are short, thereby improving chip removal.

According to the invention, the chip face is extended or continued continuously without edges and the chip angle is maintained into the region of the tip.

This represents a lengthened chip cutting face that continues without edges and steps to the tip.

The features of the invention relating to the combination of the drill plate and its attachment in the base body are characterized by an optimal reception and transfer of the chip cutting forces, while also attaining precise and a stable seating of the drill plate.

The drill plate is tensioned or clamped between the clamping jaws of the base body with the aforedescribed fastening screw.

The longitudinal axis of the fastening screw is formed so as to be oriented relative to the centering faces in the region of the centering groove of the base body in a particular manner.

First the centering function is achieved via the centering faces, whereafter the main clamping function is affected by the stop faces in the region of the fastening grooves of the base body.

The center axis of the countersunk portion of the fastening screw is displaced by a certain distance downwardly with respect to the center axis of the fastening bore of the drill plate, as measured in the axial contact face of the base body, so that the conical screw head is pressed downwardly in the counter bore of the mounting bore, when the fastening screw is tightened, thereby tensioning to the drill plate against the axial base-side contact face in the base body.

In this way, as discussed above, the base-side end of the drill plate is pressed against the bottom of the groove and secured therein when the fastening screw is tightened in the mounting bore of the base body.

This obviates the need for projections arranged on the base-side, as it is common in the state-of-the-art. The invention proposes instead to arrange diametrically opposing, widely spaced centering fins capable of transmitting a high load directly on the side faces of the drill plate.

The features of the present invention are not only recited in the individual claims, but are also encompassed by a combination of the individual claims.

All attributes and features disclosed in the application documents, including the abstract, in particular the spatial arrangement illustrated in the drawings, are claimed as an essential part of the invention, as far as they are novel in view of the state-of-the-art, either separately or in combination.

BRIEF DESCRIPTION OF THE SEVERAL VIEWS OF THE DRAWING(S)

The invention will be described hereinafter with reference to one embodiment illustrated in the drawings. Additional features and advantages of the invention are disclosed in the drawings and their description.

It is shown in:

FIG. 1 schematically, a side view of a drilling tool;
FIG. 2 a top view of the drilling tool;
FIG. 3 a perspective bottom view of a drill plate;
FIG. 4 the base body (holder);
FIG. 5 a bottom view of the drill plate;
FIG. 6 a perspective side view of the drill plate;
FIG. 7 a bottom view of the drill plate similar to that of FIG. 6;
FIG. 8 a detail A of the illustration in FIG. 7;
FIG. 9 a cross-section through the drilling tool at the height of line A-A in FIG. 1;
FIG. 10 a cross-section along the line B-B which is rotated by 90° with respect to the cross-sectional view of FIG. A-A.

DETAILED DESCRIPTION OF THE INVENTION

FIG. 1 shows in general a drilling tool, which is fabricated from a base body 2 having a mounting groove 2.2 that is open toward the top and has mutually parallel stop faces 2.2.2.

The stop faces 2.2.2 are formed mirror symmetric with respect to a longitudinal center axis through the base body 2.

The parallel arrangement of the stop faces 2.2.2 forms a mounting groove with an approximate rectangular profile, which has the advantage that the stop faces 2.2.2 are capable of transmitting a high load across their entire cross-section.

According to another embodiment, the stop faces can also have a slightly conical shape which, however, degrades the load transfer.

A clamping slot 2.3.2 is arranged at the bottom of the centering groove 2.3 which extends downwardly into the material of the base body in the axial direction.

The side of the clamping slot terminating in the base body can, if necessary, be provided with a widening bore.

Accordingly, the mounting groove 2.2 is defined in the base body 2 by two mutually opposing, mirror-symmetric clamping jaws 2.1.

FIG. 2 shows a top view on the drilling tool and a top view on the clamped drill plate 1.

As can be seen, lateral diametrically opposing centering fins 1.7 are formed on the drill plate 1 which contact corresponding centering faces 2.3.1 in the region of the centering grooves 2.3 of the clamping jaws 2.1.

Also visible are the diametrically opposed main cutting edges 1.1 of the drill plate 1. The main contact faces between the drill plate and the corresponding faces of the base body 2 are disposed in diametrical opposition from the centering fins 1.7.

It is also significant that the chip cutting face 1.2 of the drill plate 1 transitions into the centering fins 1.7 so as to protect the base body in this region against erosion caused by chip removal.

FIG. 3 shows the base-side view of a drill plate 1 with the axial base-side contact face 1.5. As can be seen, the centering fins 1.7 according to the invention are diametrically opposed and have centering faces 1.7.1.

The centering faces 1.7.1 are somewhat rounded, triangular faces that extend from the base-side (from the axial contact face 1.5) with an upward conical taper.

However, the essential torque-transmitting faces are the stop faces 1.6 which have a large surface area and extend upwardly from the axial contact face 1.5 and are each penetrated by the mounting bore 1.8.

FIG. 4 is a perspective view of the base body 2 with the formed centering groove 2.3 and the aforedescribed approximately parallel stop faces 2.2.2 that are symmetric relative to an axial longitudinal center direction. These stop faces 2.2.2 cooperate with the corresponding stop faces 1.6 of the drill plate 1.

As also seen in FIG. 4, the mounting bore 2.4 has a counter bore 2.4.1 in one (left) clamping jaw 2.1, whereas a thread 2.4.2 is formed in the opposing (right) clamping jaw 2.1.

The aforementioned centering fins 1.7 hereby contact the centering faces 2.3.1 formed with an acute angle in the region of the centering groove 2.3.

FIG. 4 also shows that the clamping slot 2.3.2 extends from the bottom of the centering groove 2.3 axially downwardly into the material of the base body 2.

FIGS. 5 and 6 show additional details of the drill plate 1. As can be seen, diametrically opposed main cutting edges 1.1 are provided which transition into each with an S-shape and hereby traverse or penetrate the tip 1.4.

The main cutting edges 1.1 hence form two convex cutting faces that in the top view appear as an S-shape.

As seen in FIG. 5, concave outlet edges 1.3 for the chip faces 1.2 are provided in opposition to the main cutting edges 1.1. The main cutting edge 1.1 of the drill plate 1 has hereby a convex shape and intersects with the tangent 1.1.1 of the drill diameter 1.1.2 at an angle of $\alpha<90°$, so that the relative cutting motion in the outer half of the diameter range has a "peeling" effect.

FIG. 6 shows that the chip face 1.2 extends on both sides of an approximately vertical edge. However, this edge appears only at a result of the drawing. In reality, the chip face 1.2 for removal of chips is a continuous curve face that extends from the tip 1.4 downwardly and has a steady and continuous curvature.

According to FIG. 6, the centering fins 1.7 form inclined centering faces 1.7.1 that cooperate with the aforedescribed, likewise inclined and approximately acute centering faces 2.3.1 in the base body 2.

FIGS. 7 and 8 show additional details of the drill plate 1 according to the invention.

It is significant that the cutting edge 1.4.1 according to FIG. 8 extends from an upper tip 1.4 that transitions flush into the main cutting edge 1.1. Accordingly, the main cutting edge 1.1 is extended by the additional cutting edge 1.4.1 into the region of the tip 1.4.

Another significant aspect is that the aforedescribed chip faces 1.2 extend into the region of the tip 1.4 in the form of extended chip faces 1.4.2.

Rounded secondary faces 1.4.3 are located laterally next to the extended chip faces 1.4.2, which together form the chip face 1.2 as a fully rounded, chip-removing face without interfering edges or protrusions.

The secondary faces 1.4.3 are secondary faces of the tip 1.4.

FIGS. 9 and 10 show additional details of the clamping attachment.

The mounting screw 3 has a conical screw head 3.1 which contacts a corresponding counter bore 2.4.1 in the region of the mounting bore 2.4.

Accordingly, the conical counter bore 2.4.1 in the left clamping jaw 2.1 makes contact in the left mounting bore 2.4 at a different location than the threaded shank 2.4.2 of the mounting screw 3 in the right mounting bore 2.4.

The two bores 2.4 in the opposing clamping jaws 2.1 are therefore slightly offset in the radial direction.

Stated differently, the longitudinal center axis through the left mounting bore 2.4 is not aligned with the longitudinal center axis through the right mounting bore 2.4. These two axes are offset relative to each other in the radial direction.

As a result, the conical screw head 3.1 contacts the counter bore 2.4.1, and the mounting screw tilts when it is tightened and extends at an angle into the opposing mounting bore 2.4b. Accordingly, at the position 2.6, which is in front of the position 2.7 in the axial direction, a tilting motion occurs, which causes the entire drill plate 1 to be pulled in the direction towards the groove bottom, where it is then formfittingly secured.

Simultaneously, the clamping slot 2.3.2 closes slightly and urges the diametrically opposed stop faces 2.2.2 into formfitting contact with the corresponding stop faces 1.6 of the drill plate 1.

With the drilling tool according to the invention, the drill plate is advantageously secured in a corresponding centering groove 2.3 in the base body 2 by a single mounting screw, without requiring additional adjusting means (such as additional threaded screws and the like).

This provides a connection capable of transferring a high load via large-area stop faces 1.6. The aforedescribed centering fins 1.7 according to the invention thereby only initially aid in centering the drill plate 1 in the base body 2, before the mounting screw 3 is tightened.

After the mounting screw 3 is tightened, two different stop faces are effective, namely the stop faces 1.6 capable of transferring a high load and the smaller centering fins 1.7 and the associated centering faces 1.7.1, which can also transfer a load.

A drill plate 1 according to the invention can transfer a high load and has a long service life, because deformation forces can be optimally transferred from the main cutting edges 1.1 to the base body 2.

It is important that the deformation forces are predominantly received by the mounting screw 3, which transfers these forces to the clamping jaws 2.1 of the base body 2.

The resulting connection is capable of transferring a high load and is protected from shear forces and wear. The arrangement of the centering fins 1.7 of the invention automatically centers the drill plate 1 in the base body 2.

The invention claimed is:

1. A drilling tool cutting insert adapted to be clamped in a rotatably driven drilling tool base body, the base body having a mounting groove formed in an end thereof defined by a pair of clamping jaws, each of the jaws having a bore therethrough, one of the bores being threaded, the bores for receiving a mounting screw for clamping said cutting insert in the mounting groove, said cutting insert comprising:
   a plate-shaped cutting element having a tip, a first end, a second opposite end, and a bore therethrough for receiving the mounting screw,
   said first end of said cutting element having an approximately S-shaped cutting edge extending across said tip and including a pair of mutually opposed convex cutting edges which extend substantially an entire radial extent of said cutting element, and
   each said convex cutting edge transitions into a concave outlet edge in a direction from said first end of said cutting element toward said second end of said cutting element, said concave outlet edges facilitating chip removal.

2. The cutting insert of claim 1 wherein each said convex cutting edge intersects a tangent of a drill diameter at an angle of <90°.

3. The cutting insert of claim 1 wherein a chip face extends continuously from each said convex cutting edge to a respective one of said concave outlet edges.

4. The cutting insert of claim 1 wherein said S-shaped cutting edge extends continuously into said tip.

5. The cutting insert of claim 1 wherein said chip faces extend continuously into said tip.

6. A drilling tool comprising:
   a drilling tool cutting insert, and
   a rotatably driven drilling tool base body, said base body having a mounting groove formed in an end thereof defined by a pair of clamping jaws, each of said jaws having a bore therethrough, one of said bores being threaded, said bores for receiving a mounting screw for clamping said cutting insert in said mounting groove, said cutting insert comprising:
   a plate-shaped cutting element having a tip, a first end, a second opposite end, and a bore therethrough for receiving the mounting screw,
   said first end of said cutting element having an approximately S-shaped cutting edge extending across said tip and including a pair of mutually opposed convex cutting edges which extend substantially an entire radial extent of said cutting element, and
   each said convex cutting edge transitions into a concave outlet edge in a direction from said first end of said cutting element toward said second end of said cutting element, said concave outlet edges facilitating chip removal.

7. The drilling tool of claim 6 wherein each said convex cutting edge intersects a tangent of a drill diameter at an angle of <90°.

8. The drilling tool of claim 6 wherein a chip face extends continuously from each said convex cutting edge to a respective one of said concave outlet edges.

9. The drilling tool of claim 6 wherein said S-shaped cutting edge extends continuously into said tip.

10. The drilling tool of claim 6 wherein said chip faces extend continuously into said tip.

11. A drilling tool cutting insert adapted to be clamped in a rotatably driven drilling tool base body, the base body having a mounting groove formed in an end thereof defined by a pair of clamping jaws, each of the jaws having a bore therethrough, one of the bores being threaded, the bores for receiving a mounting screw for clamping said cutting insert in the mounting groove, each of the jaws having a centering face, said cutting insert comprising:

a plate-shaped cutting element having a tip, a first end, a second opposite end, and a bore therethrough for receiving the mounting screw, said first end of said cutting element having a pair of mutually opposing cutting edges, said element having a chip face extending from each said cutting edge to said second end of said element, each of said chip faces having a centering fin with a centering face thereon, said cutting element centering faces adapted to engage with the centering faces on the jaws of the base body to center said cutting insert in the base body, said cutting element centering faces and the centering faces on the jaws of the base body being the sole means of centering said cutting insert in the base body, said mutually opposing cutting edges defining an approximately S-shaped cutting edge extending across said tip and including a pair of mutually opposed convex cutting edges which extend substantially an entire radial extent of said cutting element, and each said convex cutting edge transitions into a concave outlet edge in a direction from said first end of said cutting element toward said second end of said cutting element, said concave outlet edges facilitating chip removal.

12. The cutting insert of claim 11 wherein said centering fins extend between said bore and said second end of said cutting element.

13. The cutting insert of claim 11 wherein said centering faces of said centering fins are approximately perpendicular to an axis of said bore of said cutting element.

14. The cutting insert of claim 11 wherein said second end of said cutting element is pressed against a bottom of the mounting groove of the base body when the mounting screw is tightened in the base body.

15. The cutting insert of claim 14 wherein each of the bores of the clamping jaws has a corresponding bore axis, the bore axes being arranged with a mutual radial offset.

16. The cutting insert of claim 11 wherein each of the clamping jaws has a stop face, the stop faces being oriented approximately parallel to each other.

17. The cutting insert of claim 16 wherein the stop faces are formed diametrically opposed with respect to said centering fins.

18. The cutting insert of claim 11 wherein said centering faces on said centering fins taper conically from said second end of said element toward said first end of said element and wherein the centering faces on the jaws of the base body are identically formed.

19. The cutting insert of claim 11 wherein each said convex cutting edge intersects a tangent of a drill diameter at an angle of <90°.

20. The cutting insert of claim 11 wherein a chip face extends continuously from each said convex cutting edge to a respective one of said concave outlet edges.

21. The cutting insert of claim 11 wherein said S-shaped cutting edge extends continuously into said tip.

22. The cutting insert of claim 11 wherein said chip faces extend continuously into said tip.

23. A drilling tool comprising:
a drilling tool cutting insert, and
a rotatably driven drilling tool base body, said base body having a mounting groove formed in an end thereof defined by a pair of clamping jaws, each of said jaws having a bore therethrough, one of said bores being threaded, said bores for receiving a mounting screw for clamping said cutting insert in said mounting groove, each of said jaws having a centering face, said cutting insert comprising:

a plate-shaped cutting element having a tip, a first end, a second opposite end, and a bore therethrough for receiving the mounting screw, said first end of said cutting element having a pair of mutually opposing cutting edges, said element having a chip face extending from each said cutting edge to said second end of said element, each of said chip faces having a centering fin with a centering face thereon, said cutting element centering faces adapted to engage with said centering faces on said jaws of said base body to center said cutting insert in said base body, said cutting element centering faces and said centering faces on said jaws of said base body being the sole means of centering said cutting insert in said base body, said mutually opposing cutting edges defining an approximately S-shaped cutting edge extending across said tip and including a pair of mutually opposed convex cutting edges which extend substantially an entire radial extent of said cutting element, and each said convex cutting edge transitions into a concave outlet edge in a direction from said first end of said cutting element toward said second end of said cutting element, said concave outlet edges facilitating chip removal.

24. The drilling tool of claim 23 wherein said centering fins extend between said bore and said second end of said cutting element.

25. The drilling tool of claim 23 wherein said centering faces of said centering fins are approximately perpendicular to an axis of said bore of said cutting element.

26. The drilling tool of claim 23 wherein said second end of said cutting element is pressed against a bottom of said mounting groove of said base body when the mounting screw is tightened in said base body.

27. The drilling tool of claim 26 wherein each of said bores of said clamping jaws has a corresponding bore axis, said bore axes being arranged with a mutual radial offset.

28. The drilling tool of claim 23 wherein each of said clamping jaws has a stop face, said stop faces being oriented approximately parallel to each other.

29. The drilling tool of claim 28 wherein said stop faces are formed diametrically opposed with respect to said centering fins.

30. The drilling tool of claim 23 wherein said centering faces on said centering fins taper conically from said second end of said element toward said first end of said element and wherein the centering faces on the jaws of the base body are identically formed.

31. The drilling tool of claim 23 wherein each said convex cutting edge intersects a tangent of a drill diameter at an angle of <90°.

32. The drilling tool of claim 23 wherein a chip face extends continuously from each said convex cutting edge to a respective one of said concave outlet edges.

33. The drilling tool of claim 23 wherein said S-shaped cutting edge extends continuously into said tip.

34. The drilling tool of claim 23 wherein said chip faces extend continuously into said tip.

* * * * *